Dec. 20, 1966  A. O. G. ERNST ET AL  3,292,376
ROCKET NOZZLE PROTECTION SYSTEM
Filed June 15, 1964
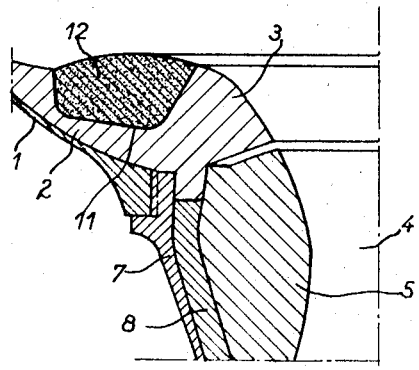
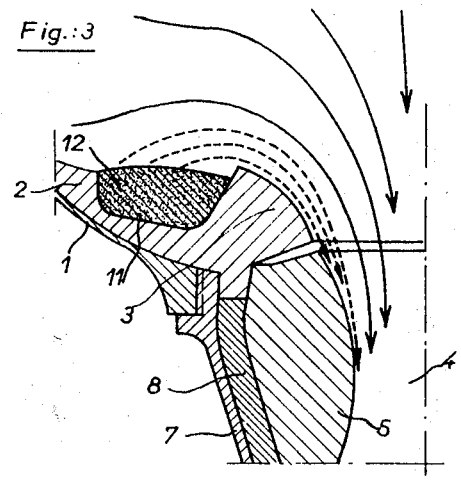
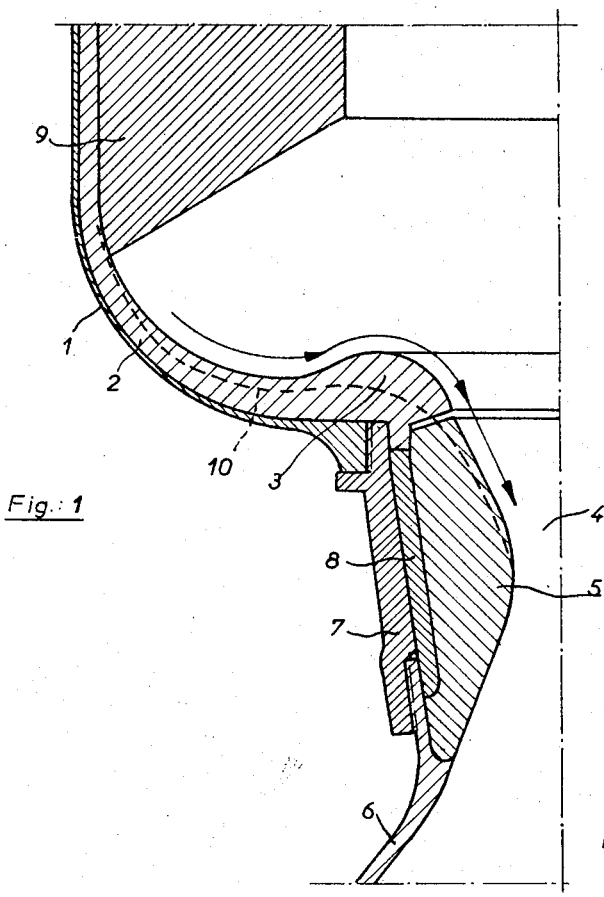
Inventors
Adolphe O. G. Ernst
Roger A. Feraud
Francis J.-M. G. Tremouilles
By Stevens, Davis, Miller & Mosher
Attorneys United States Patent Office 3,292,376
Patented Dec. 20, 1966

3,292,376
ROCKET NOZZLE PROTECTION SYSTEM
Adolphe Otton Gontier Ernst, Bois-le-Roi, Roger Adrien Feraud, Bourg-la-Reine, and Francis Jean-Marie Guy Tremouilles, Paris, France, assignors to Societe Nationale d'Etude et de Construction de Moteurs d'Aviation, Paris, France, a company of France
Filed June 15, 1964, Ser. No. 374,961
Claims priority, application France, June 18, 1963, 938,496
2 Claims. (Cl. 60—253)

The invention relates to rockets using solid propellant or powder.

It is known that the combustion of powder for the propulsion of rockets produces a jet of flame at very high temperature and that it is necessary to protect the body of the rocket, and more particularly the rear end and the nozzle thereof, against the thermic and erosive action of this jet.

FIGURE 1 of the accompanying drawings shows the rear part of a rocket of known type. The envelope is shown at 1 and the protective coating thereof at 2, the latter having a zone 3 of increased thickness at the rear end, at the inlet to the nozzle 4. The latter comprises a refractory member 5 suitably shaped in order to constitute the nozzle throat and interposed between the end 3 of the rocket and the divergent terminal portion 6, which is connected to the envelope 1 by a sleeve 7, an insulating member 8 being interposed between the latter and the nozzle throat 5.

As has been said, the combustion of the block 9 of powder, which is of tubular form, produces a jet of flame which strikes the rear end 3 and then escapes by way of the nozzle throat 5. This gives rise to rapid and substantial erosion of the rear end and of the upstream part of the neck, as shown by the dotted-line profile 10.

In accordance with the present invention, in order to protect the rear end of the rocket and also the nozzle against the thermic and erosive action of the combustion gases, there is disposed in a suitable seating provided in the said rear end, around the inlet to the nozzle, an auxiliary propellant grain which is selected so that it will emit gases which are less hot and less erosive than the said combustion gases of the main powder block.

In the drawings:

FIGURE 1 is a fragmentary axial half-section of the rear part of a known rocket, such as has been referred to above and FIGURES 2 and 3 are corresponding views showing the improvement in accordance with the present invention, before and after ignition of the rocket, respectively.

Referring to FIGURES 2 and 3, the improvement consists in providing an annular cavity or recessed seating 11 in the shape of a trough formed in the transverse rear end portion 3 of the rocket, around the central inlet passage to the nozzle 4, said trough-shaped seating being wide open forwardly toward the interior of the rocket casing and having rearwardly a sunken bottom; and in fitting into said seating 11 an auxiliary propellant grain 12 the combustion of which will generate gases which are less hot and less erosive than those from the main combustion. By way of example, the said propellant grain can have the following composition: 50 to 75% of ammonium nitrate, 50 to 25% of a binder such as a polysulphite, polybutadiene, polyurethane or vinyl polyester, and finally a plasticiser.

The relatively cool and non-erosive gases derived from the combustion of the propellant grain 12 tend to separate the streams of hot and corrosive gas of the main combustion from the rocket-end 3 and then flow over the wall of the nozzle throat 5, forming a protective fluid layer along the latter as indicated by the dotted arrows in FIGURE 3.

Thus as the propellant grain 12 is consumed, it contributes to the propulsion and, moreover, as long as it is not entirely consumed, it provides a mechanical and dynamic protection for the rocket-end.

As a result there is, in particular, all other things being equal, a substantial reduction in the weight of the protective coating of the rocket-end as compared with known arrangements, such as that of FIGURE 1.

Moreover, the maintenance of the shape of the inlet to the nozzle ensures that its aerodynamic characteristics are preserved throughout its operation.

What is claimed is:

1. In a rocket having a longtiudinally extending casing formed with a generally annular transverse rear end portion which bounds a central passage, a main solid propellant body housed in said casing upstream of said rear end portion and adapted, when ignited, to produce high temperature main combustion gases to issue through said central passage, a jet propulsion nozzle fitted to said rear end portion and having a bare and smooth convergent-divergent inner surface of non-combustible material to lead and expand the gases issuing through said central passage, the improvement comprising a trough-shaped recessed seating formed in said transverse rear end portion around said central passage and upstream of said bare convergent-divergent surface, said trough-shaped seating being wide open forwardly toward the interior of said casing and having rearwardly a sunken bottom, and an auxiliary solid propellant body fitted in said seating and freely exposed in the path of said main combustion gases for producing, when ignited, auxiliary combustion gases at a temperature lower than said high temperature main gases thereby generating a peripheral layer of lower temperature gases around the high temperature gases to form a protective gaseous sheath flowing along and in contact with said bare convergent-divergent surface.

2. The improvement as claimed in claim 1, wherein the seating extends annularly around the central passage, the the auxiliary solid propellant body is of annular shape, and said seating, auxiliary body, central passage and convergent-divergent surface are substantially coaxial.

References Cited by the Examiner
UNITED STATES PATENTS

| | | | |
|---|---|---|---|
| 2,699,036 | 1/1955 | Nicholson | 60—35.6 |
| 3,052,092 | 9/1962 | Kirkbride | 60—35.6 |
| 3,091,924 | 6/1963 | Wilder | 60—35.6 X |
| 3,092,963 | 6/1963 | Lawrence | 60—35.6 X |
| 3,106,061 | 10/1963 | Eder | 60—35.6 X |
| 3,137,126 | 6/1964 | Madison | 60—35.6 X |
| 3,137,998 | 6/1964 | Beam | 60—35.6 |
| 3,180,086 | 4/1965 | Ernst et al. | 60—35.6 |
| 3,191,379 | 6/1965 | Pierce | 60—35.6 |

MARK NEWMAN, Primary Examiner.
CARLTON R. CROYLE, Examiner.